United States Patent [19]
Berthold et al.

[11] Patent Number: 4,506,148
[45] Date of Patent: Mar. 19, 1985

[54] IDENTIFICATION CARD

[75] Inventors: Rainer Berthold, Gaiberg; Rainer Strietzel, Heidelberg, both of Fed. Rep. of Germany

[73] Assignee: Brown, Boveri & Cie AG, Mannheim, Fed. Rep. of Germany

[21] Appl. No.: 439,298

[22] Filed: Nov. 4, 1982

[30] Foreign Application Priority Data

Nov. 5, 1981 [DE] Fed. Rep. of Germany ....... 3143915

[51] Int. Cl.³ .............................................. G06K 5/00
[52] U.S. Cl. ..................................... 235/380; 235/382
[58] Field of Search ................................. 235/380, 382

[56] References Cited
U.S. PATENT DOCUMENTS 3,806,874  4/1974  Ehrat ..................................... 235/380

*Primary Examiner*—Harold I. Pitts
*Attorney, Agent, or Firm*—Herbert L. Lerner; Laurence A. Greenberg

[57] ABSTRACT

Identification card, including a card body, an integrated semiconductor circuit being mechanically inserted and protected in the card body for storing data to be read-out and read-in in changed form, a receiving antenna device, a rectifier circuit connected to the receiving antenna device, a filter circuit connected between the rectifier circuit and the integrated semiconductor circuit. The rectifier and filter circuits generate a supply voltage for the integrated semiconductor circuit from an energy field, a microwave transmitting antenna connected to the integrated semiconductor circuit, and a transmitter connected to the transmitting antenna.

7 Claims, 3 Drawing Figures

IDENTIFICATION CARD

BACKGROUND OF THE INVENTION

The invention relates to an identification card in the form of a Eurocheque card with an integrated semiconductor circuit inserted in a mechanically protected manner. The semiconductor circuit stores data which is or is not related to a particular person and can be read-out and optionally read-in in changed form.

Such cards are known for use as credit cards from the German journal "Markt+Technik", No. 9 of Feb. 29, 1980, pages 66 and 68. In this case a card about 0.76 mm thick which is put together from three PVC layers is involved. An interposed polyimide foil serves as the base material of a printed circuit and supports at least one integrated semiconductor circuit. The foil is so flexible that slight bending, which is unavoidable when the card is used, cannot damage the card or the semiconductor circuits. The middle layer of the three PVC layers is cut out in the area in which the semiconductor circuits are located, so that room is left for certain movements. In addition to the printed circuit with the semiconductor circuits, photographs, signatures or a magnetic strip can also be welded into the card, which can serve as an additional data carrier. If required, the card can be embossed in addition. The connection between the semiconductor circuits which store personal and other data depending on the purpose of the card, is accomplished by contacts on the upper surface of the card. Since these contacts can get dirty or oxidized, for instance, during the use of the card, the contacts of the read or data pickup equipment must execute a rocking motion on the contacts.

Depending on the application of the card, the integrated semiconductor circuit will be constructed as a programmable read-only memory (PROM), as an erasable programmable read-only memory (EPROM) or as a microprocessor. It is evident that the structure with a microprocessor offers the largest number of possibilities but is, on the other hand, also the most expensive. Since in such cards, however, provision must be made against abuse of data and unauthorized use, which involves a certain minimum amount of expense, it can be expected that the last-mentioned construction will prevail.

The weak points of all of the systems mentioned so far are the electric contacts which establish the connection between the integrated semiconductor circuit and the reading equipment. As already mentioned, these contacts can oxidize or get dirty. Furthermore, the card itself or the contact configuration in the reader can be misadjusted. It is a further disadvantage of the known structures that the card must be inserted into the reader in a very definite manner, which is accomplished by many users only after several attempts in spite of detailed operating instructions on the reader.

It is accordingly an object of the invention to provide an identification card which overcomes the hereinaforementioned disadvantages of the heretofore-known devices of this general type, and which is convertible and compatible with the cards already in use and proposed for the future, but requires no contacts.

SUMMARY OF THE INVENTION

With the foregoing and other objects in view there is provided, in accordance with the invention, an identification card, in the form of a Eurocheque card, comprising a card body, an integrated semiconductor circuit being mechanically inserted and protected in the card body for storing personal or non-personal data to be read-out and optionally read-in in changed form, a high or very high frequency antenna or antenna array, a rectifier circuit connected to the receiving antenna means, a filter circuit connected between the rectifier circuit and the integrated semiconductor circuit, the rectifier and filter circuits generating a supply voltage for the integrated semiconductor circuit from a high or very high frequency energy field, a microwave transmitting antenna connected to the integrated semiconductor circuit, and a transmitter connected to the transmitting antenna.

The invention makes use of the devices and methods described in German Pat. No. 25 08 201 and in German Published, Non-Prosecuted Applications DE-OS Nos. 30 09 179, 29 19 753 or 29 46 942. These are equipment which include a stationary interrogator and a movable transponder. The interrogator includes a power transmitter and an opening-code transmitter which transmits the opening code stored in an opening code memory, and optionally a supplementary opening code memory, as well as an identity receiver and a data processing unit. The transponder contains a power receiver which converts the radiated energy into the power supply for the electronic circuitry of the transponder. The transponder further contains an opening code receiver with an opening-code comparator which compares the code stored in an opening code memory, and optionally in an opening code supplementary memory, with the code received through the radio path. The output signal of the opening code comparator controls an identity transmitter through an opening code processor. The identity code which can be transmitted by the identity transmitter over a further radio path to the interrogator is stored in an identity code memory, and optionally in one or more identity code supplementary memories. By means of an additional identity coding receiver in the transponder, the identity part stored in the supplementary identity code memory can be changed by radio as desired. Since the amount of radiated energy is naturally small but the identity transmitter should transmit a reply signal with as much energy as possible in order to obtain a long range, the signal carrier to be radiated by the identity transmitter can be generated in the stationary interrogator and transmitted with the power beam and the opening code to a movable transponder, where the reply signal carrier is merely modulated by the identity transmitter before it is reradiated.

The identification card according to the invention has the advantages that no contacts are required and that the card need not be inserted into a reader because it is sufficient to bring it into the power beam which covers a certain area. It may, for instance, be sufficient to place the card on the window counter where the card is read completely automatically.

It is also possible to process several cards simultaneously if the method for identifying and/or counting objects from a central interrogation station, described in German Published, Non-Prosecuted Application DE-OS No. 29 46 942, is used.

In accordance with another feature of the invention, the receiving and transmitting antennae and the filter circuit are constructed in stripline, microstrip or microslot technology. Microstrip or microslot techniques are particularly available to be used in this case since, because of the given external dimensions of the identification cards, the dimensions of the antennae are also given and the stripline technique has been a proven technique in the microwave area of interest for years.

In accordance with a further feature of the invention, the rectifier circuit is in the form of a voltage doubler circuit. In this manner it is possible to generate voltages of 1.5 V from the radiated microwave energy, such as is required for the operation of low-voltage CMOS circuits, in spite of a minimal expenditure for antennae and filter elements. Low-voltage CMOS circuits require extremely low power; they are used, for instance, in well-known digital watches.

In accordance with an added feature of the invention, there is provided a coupling device connected between the output of the rectifier circuit and the integrated semiconductor circuit, for picking up modulation energy received with high or very high frequency energy of the energy field from the rectifier circuit and passing it on as an information signal to the integrated semiconductor circuit. The information signal may involve the opening code described in the above-mentioned German published patent applications and the changing code for the supplementary identity memory as well as the signals required for reading-out and optionally reading-in again of the personal data.

In accordance with a concomitant feature of the invention, the receiving antenna and the transmitter antenna are combined into one structure. This feature is especially space-saving.

Identification cards according to the invention are particularly well suited to be used as an account card, i.e., as a money, checking or credit card, as a customer card, as a personal ID card, as a company pass with or without access control for certain security areas, as a health certificate, as a driver's license, a motor vehicle registration or as an insurance certificate. It is of particular advantage that the card need not be visibly presented or even inserted into a reader; it is rather sufficient for the card to be taken into a suitable energy field even if it remains in the breast pocket of a suit, for instance.

Other features which are considered as characteristic for the invention are set forth in the appended claims.

Although the invention is illustrated and described herein as embodied in an identification card, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENT

Figure 1:
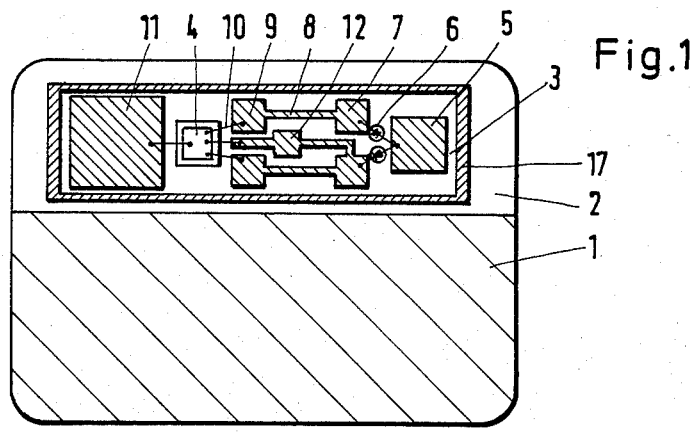
FIG. 1 is a diagrammatic, cross-sectional view of an identification card with a microwave receiving and transmitting circuit.

Referring now to the figures of the drawing and first particularly to FIG. 1 thereof, it is seen that the identification card shown therein corresponds as to size and makeup to the conventional Eurocheque card. The body of the identification card contains an area 1, in which data concerning a particular person are presented in such a way as to be optically readable. The card body contains a further area 2, the front of which carries the checking card owner's authentic signature and the back of which may carry a coded magnetic strip. This further area 2 is shown with the cover layer removed, so that the electronic circuitry embedded at that location can be seen. There may be seen a back metallization 3 disposed over the entire surface, which is in turn disposed under a dielectric 17 suitable for high frequency, such as aluminum oxide or polytetrafluoroethylene, etc. Disposed in a cutout formed in the area 2 of the body of the card is an integrated semiconductor circuit 4 which is connected to the rest of the ciruit components by means of bonding wires 10. The cutout for receiving the semiconductor circuit 4 is necessary because at present semiconductor circuits are not yet able to be commercially manufactured as thin as desired, while the other circuit components can be manufactured in thin or thick film technology and thus have thicknesses in the micrometer range.

Disposed on the back metallization 3 and on the dielectric 17 is a receiving antenna 5 in the form of a square metal area. Two diodes 6 are connected from the receiving antenna 5 to further metal areas 7. The metal areas 7 are connected by a conductor connection 8 to an additional metal area 9, from which the bonding wires 10 lead to the semiconductor circuit 4. A microwave transmitting antenna 11 which is in the form of a metallized area, is disposed at the output of the semiconductor circuit 4.

The two metal areas 7, 9 as well as the connecting conductor run 8 form a CLC-circuit which acts as a filter circuit and filters and smoothes the microwave energy which is received by the receiving antenna 5 and rectified in the diodes 6, so that it is suitable as the supply voltage for the semiconductor circuit 4. Depending on the required filtering action, it is sufficient to provide only the metallization 7 directly adjacent the diodes 6 and to bring the bonding wires from the metallization 7 directly to the semiconductor circuit 4; in this case, only the bonding wires serve as a choke, while the charging capacity is integrated into the semiconductor circuit 4.

There is further seen a coupling device 12 in the form of a series L-C circuit. By means of the coupling device 12, a modulation energy which is transmitted with the microwave energy field and is received by the receiving antenna 5 is fed-out at the output of the diodes 6 and passed-on to the semiconductor circuit 4 as an information signal.

The active transmitting circuit as well as the passive receiving circuit can be manufactured in hybrid microwave technology. In addition, it is basically possible to fabricate microwave circuits directly on a semiconductor substrate and to integrate the different semiconductor elements (see, for example, the publication "Elektronik-Anzeiger" 1977, No. 4, pages 31 to 37, particularly page 31).

Figure 2:
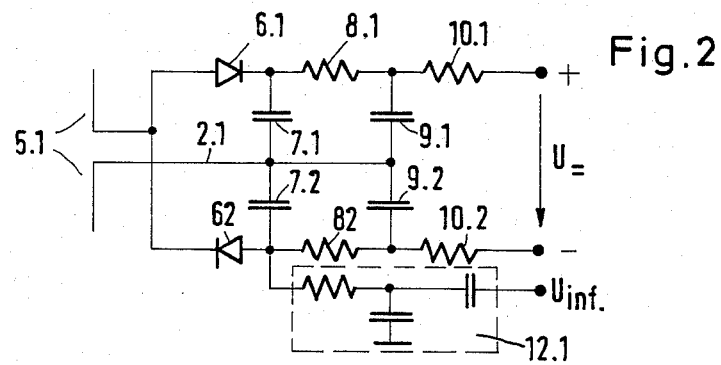
FIG. 2 is a schematic diagram of the equivalent electrical circuit of the receiving circuit.

FIG. 2 shows the equivalent electric circuit diagram of the receiving circuit shown in FIG. 1 in stripline technology. In FIG. 2 there is seen a receiving antenna proper 5.1. One terminal of the antenna 5.1 acts as the electrical center and another terminal of the antenna is connected to the two diodes 6.1, 6.2 in a voltage doubler circuit. Charging capacitors 7.1, 7.2 are connected to the electrical center at the output of the two diodes 6.1, 6.2. The electric current flows through filter chokes 8.1, 8.2, filter capacitors 9.1, 9.2 and further filter chokes 10.1, 10.2 to voltage supply terminals of the semiconductor circuit 4. A supply d-c voltage $U_=$ is thus generated. Further connected to the output of the diode 6.2 is the coupling device 12.1 which picks up the modulation energy received with the microwave energy field from the signal mixture present at the filter capacitors 7.1, 7.2 and passes it on as an information signal $u_{inf}$ to the semiconductor circuit 4.

Figure 3:
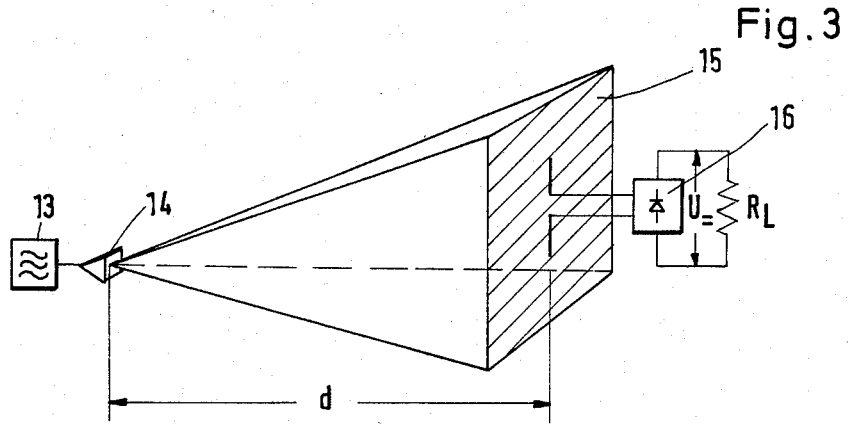
FIG. 3 is a diagrammatic perspective view of the practical application of the device.

FIG. 3 diagrammatically illustrates an example of the application of the device. There is seen a microwave transmitter 13 with a horn or planar antenna 14 connected thereto which radiates a beamed radiation field. The radiation field builds up an energy field 15 at a distance of, for instance, d=2 m. The size of the energy field 15 is, for instance, $2 \times 2$ m$^2$. The energy field is capable of generating a supply voltage $U_=$ of, for instance, 1.5 V at a load resistance $R_L$ of 150 kohm at the output of a rectifier circuit 16 corresponding to the circuit shown in FIG. 1 or FIG. 2. In the vicinity of the antenna, the legally permissible energy density for microwaves of 10 mW/cm$^2$ is not yet reached by far.

The foregoing is a description corresponding to German Application No. P 31 43 915.2, dated Nov. 5, 1981, the International priority of which is being claimed for the instant application, and which is hereby made part of this application. Any discrepancies between the foregoing specification and the aforementioned corresponding German application are to be resolved in favor of the latter.

We claim:

1. Identification card, comprising a card body, an integrated semiconductor circuit being mechanically inserted and protected in said card body for storing data to be read-out and read-in in changed form, receiving antenna means, a rectifier circuit connected to said receiving antenna means, a filter circuit connected between said rectifier circuit and said integrated semiconductor circuit, said rectifier and filter circuits generating a supply voltage for said integrated semiconductor circuit from an energy field, a microwave transmitting antenna connected to said integrated semiconductor circuit, and a transmitter connected to said transmitting antenna.

2. Identification card according to claim 1, wherein said receiving and transmitting antennae and said filter circuit are constructed in stripline technology.

3. Identification card according to claim 1, wherein said receiving and transmitting antennae and said filter circuit are constructed in microstrip technology.

4. Identification card according to claim 1, wherein said receiving and transmitting antennae and said filter circuit are constructed in microslot technology.

5. Identification card according to claim 1, wherein said rectifier circuit is in the form of a voltage doubler circuit.

6. Identification card according to claim 1, including a coupling device connected between said rectifier circuit and said integrated semiconductor circuit, for picking up modulation energy received with energy of the energy field from said rectifier circuit and passing it on as an information signal to said integrated semiconductor circuit.

7. Identification card according to claim 1, wherein said receiving antenna and said transmitting antenna are combined into one structure.

* * * * *